(12) United States Patent
Rath et al.

(10) Patent No.: US 7,847,020 B2
(45) Date of Patent: Dec. 7, 2010

(54) POLYISOBUTENE POLYOL AND MOULDING COMPOUND

(75) Inventors: Hans Peter Rath, Gruenstadt (DE); Arno Lange, Bad Duerkheim (DE); Helmut Mach, Heidelberg (DE); J. Richard Blackborow, Strasbourg (FR)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 12/065,284

(22) PCT Filed: Aug. 28, 2006

(86) PCT No.: PCT/EP2006/008406

§ 371 (c)(1), (2), (4) Date: Feb. 29, 2008

(87) PCT Pub. No.: WO2007/025699

PCT Pub. Date: Mar. 8, 2007

(65) Prior Publication Data

US 2008/0227916 A1    Sep. 18, 2008

(30) Foreign Application Priority Data

Sep. 2, 2005    (DE) .................... 10 2005 041 788

(51) Int. Cl.
*C08F 8/00*    (2006.01)

(52) U.S. Cl. ............ 525/55; 525/107; 525/123; 528/44; 528/403; 528/418; 528/421

(58) Field of Classification Search ............. 525/123
See application file for complete search history.

(56) References Cited

U.S. PATENT DOCUMENTS

| | | | |
|---|---|---|---|
| 3,734,786 A | 5/1973 | Walden et al. | |
| 4,579,928 A | 4/1986 | Kay et al. | |
| 5,585,444 A * | 12/1996 | Blackborow et al. | 525/337 |
| 5,985,369 A * | 11/1999 | Kerkmann et al. | 427/380 |
| 2006/0270800 A1 * | 11/2006 | Teyssie et al. | 525/191 |

FOREIGN PATENT DOCUMENTS

| | | | |
|---|---|---|---|
| DE | 10338245.3 | * | 8/2003 |
| EP | 0 468 966 | | 5/1995 |
| EP | 0 737 662 | | 10/1996 |
| WO | 02 48215 | | 6/2002 |

* cited by examiner

*Primary Examiner*—Randy Gulakowski
*Assistant Examiner*—Kyle Baumstein
(74) *Attorney, Agent, or Firm*—Oblon, Spivak, McClelland, Maier & Neustadt, L.L.P.

(57) ABSTRACT

An isobutene polymer which has an average of at least 1.4 terminal 1,3-propanediol groups is described, as is a crosslinking product thereof. Suitable crosslinkers are difunctional or higher-functionality isocyanates or epoxy compounds having at least two epoxide groups. The crosslinking products exhibit high storage moduli even at elevated temperatures.

12 Claims, 1 Drawing Sheet

POLYISOBUTENE POLYOL AND MOULDING COMPOUND

Figure 1:
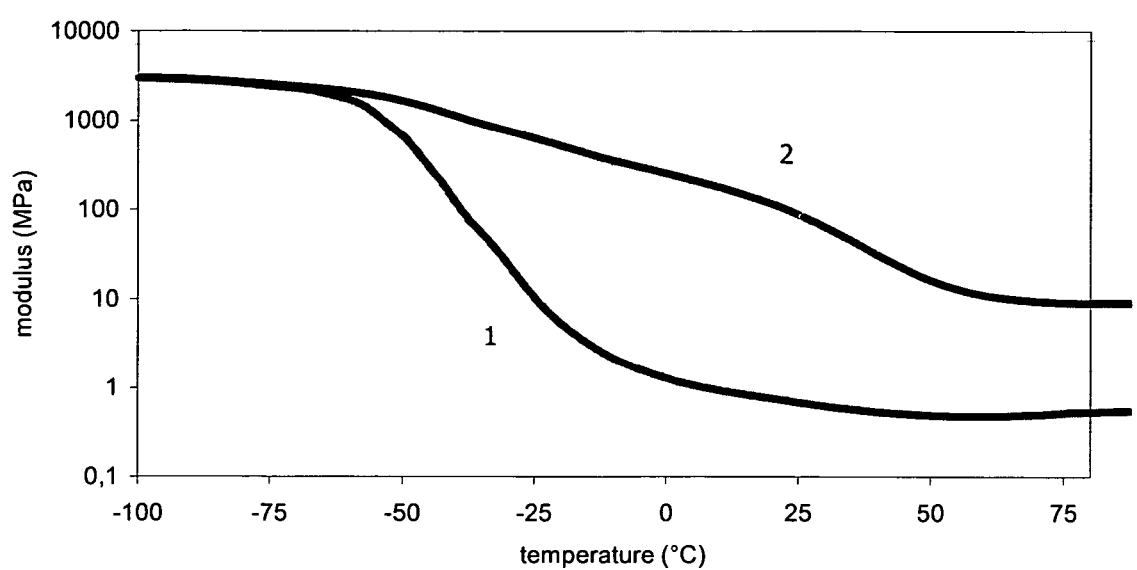

The invention relates to a polyisobutene polyol and to a molding composition which comprises a crosslinking product of the polyisobutene polyol.

Polyisobutene rubbers feature special properties such as low gas and moisture permeability, high elasticity and cold flexibility down to very low temperatures. Polyisobutenes have excellent weathering and UV resistance.

DE-A 10338245 describes a molding composition composed of a mixture of interpenetrating polymers having a first phase of a crosslinked isobutene polymer and a second phase of a stiffening polymer which comprises (meth)acryloyl and/or vinylaromatic units, the first phase comprising the reaction product of an isobutene polymer and a crosslinker.

EP-A-0737662 discloses polyisobutenes with a terminal 1,3-propanediol group. This publication does not take account of polyisobutenes having more than one 1,3-propanediol group per molecule.

The known polyisobutene rubbers have a markedly sigmoidal profile of the storage modulus (which is a measure of the elasticity) as a function of temperature, with high elasticity at low temperatures and low elasticity at higher temperatures. This behavior is thought to be based on the fact that the hard segments of the rubber "melt" at a certain temperature and the elastic behavior of the network is lost.

It is an object of the invention to provide a polyisobutene rubber which retains high elasticity even at elevated temperatures, and also isobutene polymers which are suitable for producing these rubbers.

The object is achieved by an isobutene polymer which has, per molecule, an average of at least 1.4 terminal 1,3-propanediol groups, preferably an average of at least 1.7 terminal 1,3-propanediol groups.

Preferred embodiments of the isobutene polymer relate to linear polymers which have substantially 1,3-propanediol groups at both ends of the molecule, and also star-shaped polymers with three or four branches, which substantially have 1,3-propanediol groups at all ends of the molecule.

The isobutene polymer preferably has a number-average molecular weight of from 500 to 50 000, in particular form 750 to 10 000, most preferably from 900 to 5000.

Inventive isobutene polymers are obtainable by reacting a precursor polymer having terminal epoxide groups with a borane and then oxidatively cleaving the borate ester formed to give a 2-polyisobutenyl-1,3-propanediol. The reaction scheme is illustrated below, without showing the complete molecule but rather just a section of one end of the molecule.

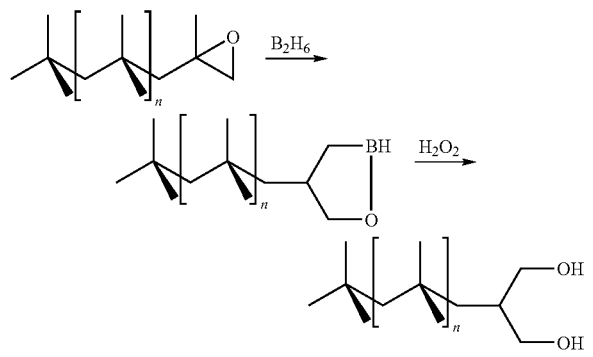

The reaction scheme above illustrates the reaction of a 1,2-epoxy group with participation of a methyl group adjacent to the epoxy group. The reaction is also conceivable starting from a 2,3-epoxy group and/or with participation of an adjacent methylene group. This affords a mixture of secondary and primary OH groups.

Suitable boranes are, for example, diborane ($B_2H_6$) and alkyl- and arylboranes $RBH_2$ (R=alkyl or aryl). It is familiar to the person skilled in the art that such boranes can also be prepared in situ from a borohydride and an acid, usually $BF_3$ etherate. The reaction with the borane is effected suitably in a borane-coordinating solvent. Examples thereof are open-chain ethers such as dialkyl ethers, diaryl ethers or alkyl aryl ethers, and cyclic ethers, such as tetrahydrofuran or 1,4-dioxane. Other solvents such as aromatic hydrocarbons, for example toluene, aliphatic hydrocarbons, for example, cyclohexane, and halogenated hydrocarbons, for example methylene chloride or n-butyl chloride, are likewise suitable.

The oxidative cleavage to give the 1,3-diol can be effected, for example, by means of hydrogen peroxide in the presence of a base with heating to, for example, from 50 to 75° C. Suitable solvents for this purpose are ethers or mixtures of ethers and hydrocarbons.

The conversion of the epoxides to a polyisobutene derivative with terminal 1,3-propanediol group is described, for example in EP-A-0737662, which is hereby fully incorporated by reference.

The epoxide can be prepared from an isobutene polymer with terminal olefinically unsaturated groups by epoxidation in a customary manner, for example by reaction with a peracid, such as m-chloroperbenzoic acid or peracetic acid. The peracetic acid can also be prepared in situ from acetic acid and hydrogen peroxide in the presence of an acidic catalyst. Suitable epoxidation processes are described in J. P. Kennedy et al., J. Polymer Science, Polymer Chemistry ed., vol. 20, 2809-2817 (1982), and EP-A-0737662, WO 92/14806 and U.S. Pat. No. 6,303,703, which are hereby fully incorporated by reference.

In a preferred embodiment for the epoxidation, the isobutene polymer is reacted with aqueous hydrogen peroxide solution in the presence of at least one carboxylic acid in a hydrocarbon azeotroping agent with azeotropic removal of water. The reaction is generally performed at a temperature in the range of from 45 to 90° C., preferably from 50 to 75° C. In order to work within the temperature range specified when a relatively high-boiling azeotroping agent is used and/or to be able to remove the heat of reaction at least partly by evaporative cooling, it may be necessary to perform the reaction at reduced pressure. It is suitable, for example to work at a pressure in the range of from 100 to 500 mbar. Suitable hydrocarbon azeotroping agents are aliphatic hydrocarbons such as hexane, heptane; alicyclic hydrocarbons such as cyclohexane, methylcyclohexane, ethylcyclohexane; and aromatic hydrocarbons such as benzene, toluene or xylene. Toluene and cyclohexane are the most preferred. The carboxylic acid is preferably formic acid or a combination of formic acid and an acid selected from acetic acid and propionic acid. The epoxidizing agent is a peracid which is formed in situ from the carboxylic acid and the hydrogen peroxide. The removal of water shifts the reaction equilibrium to the side of the peracid. Moreover, the equilibrium of partition of the peracid between the aqueous and the organic phase is influenced by the withdrawal of water, and the peracid is driven into the organic phase.

The isobutene polymers which are useful as a starting material for the epoxidation comprise generally at least 50% by weight of isobutene units, preferably at least 80% by weight of isobutene units, in particular at least 95% by weight of isobutene units. In addition to isobutene units, the isobutene polymer may also comprise units of olefinically unsaturated monomers which are copolymerizable with isobutene under cationic polymerization conditions. The comonomers may be distributed randomly in the polymer or be arranged as blocks. Useful copolymerizable monomers include in particular vinylaromatics such as styrene, $C_1$-$C_4$-alkylstyrenes such as α-methylstyrene, 3- and 4-methylstyrene, or 4-tert-butylstyrene, and also isoolefins having from 5 to 10 carbon atoms such as 2-methylbutene-1, 2-methylpentene-1, 2-methylhexene-1, 2-ethylpentene-1, 2-ethylhexene-1 and 2-propylheptene-1.

The olefinically unsaturated group may, for example, be aliphatic unsaturated groups having from 2 to 6 carbon atoms, such as vinyl, allyl, methylvinyl, methallyl, propenyl, 2-methylpropenyl, butenyl, pentenyl, hexenyl; or cyclic unsaturated hydrocarbon radicals such as cyclopropenyl, cyclobutenyl, cyclopentenyl and cyclohexenyl. Preference is given to isobutene polymers having terminal allyl, methallyl, 2-methylpropenyl or cyclopentenyl groups.

The molecules are linear molecules which have substantially olefinic double bonds at both ends of the molecule, or star-shaped polymers which have olefinic double bonds at the ends of the molecule.

Such isobutene polymers can be prepared by processes which are described in U.S. Pat. Nos. 4,946,889, 4,327,201, 5,169,914, EP-A-206 756, EP-A-265 053, and also comprehensively in J. P. Kennedy, B. Ivan, "Designed Polymers by Carbocationic Macromolecular Engineering", Oxford University Press, New York, 1991. The isobutene polymers are prepared by living cationic polymerization of isobutene. The initiator system used comprises generally a Lewis acid and an "initiator", i.e. an organic compound having a readily substitutable leaving group which forms a carbocation or a cationogenic complex with the Lewis acid. The initiator is generally a tertiary halide, a tertiary ester or ether or a compound having a halogen atom in the allyl position or an alkoxy or acyloxy group in the allyl position. The carbocation or the cationogenic complex add or insert successive isobutene molecules onto the cationic site, which forms a growing polymer chain whose end is usually terminated by the leaving group of the initiator. The initiator may be monofunctional or have higher functionality; in the latter case, polymer chains grow in more than one direction.

Isobutene polymers with a terminal double bond can be obtained in various ways. It is possible to start from olefinically unsaturated inifer molecules. In order to obtain polyisobutene molecules having more than one terminal double bond per molecule, it is likewise possible to introduce an olefinic double bond at the distal chain end or to couple two or more living polymer chains. Both possibilities are explained in detail below.

Alternatively, the starting materials used are initiator molecules without an olefinic double bond and the distal chain ends are terminated to form an ethylenically unsaturated group, in which case, for example, the reactive chain ends are reacted with a terminating reagent which attaches an ethylenically unsaturated group to the chain ends, or treated in a suitable manner to convert the reactive chain ends to such groups.

Preference is given to initiators in which the functional group has the general formula FG

in which

X is selected from halogen, $C_1$-$C_6$-alkoxy and $C_1$-$C_6$-acyloxy, $R^1$ is hydrogen or methyl and $R^2$ is methyl or, with $R^1$ or the molecular moiety to which the functional group FG is bonded, forms a $C_5$-$C_6$-cycloalkyl ring; $R^2$ may also be hydrogen when the functional group FG is bonded to an aromatic or olefinically unsaturated carbon atom.

The initiators preferably have one, two, three or four, in particular one or two, and more preferably two, functional groups FG. X in formula (FG) is preferably a halogen atom, in particular chlorine.

Preferred initiators obey, for example, the general formulae I-A to I-F:

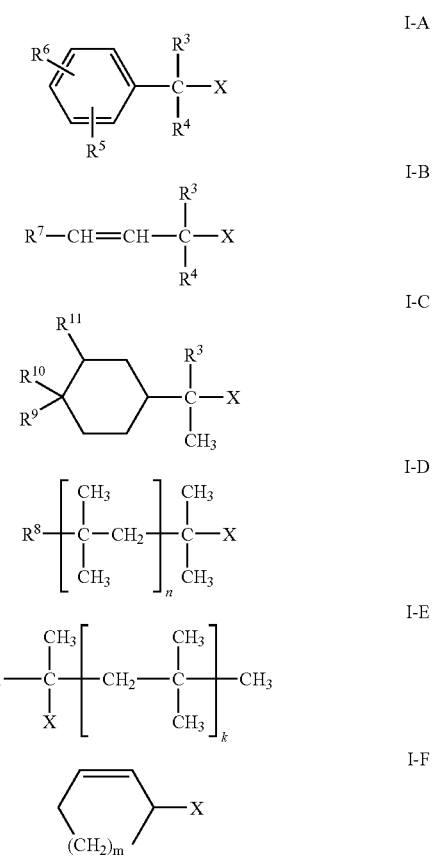

in which X is as defined above;

n and k are each independently 0, 1, 2, 3, 4 or 5;

m is 1, 2 or 3;

$R^3$, $R^4$ and $R^{10}$ are each independently hydrogen or methyl;

$R^5$, $R^6$ and $R^7$ are each independently hydrogen, $C_1$-$C_4$-alkyl or a $CR^3R^4$—X group in which $R^3$, $R^4$ and X are each as defined above; and $R^8$ is hydrogen, methyl or an X group; and $R^9$ and $R^{11}$ are each hydrogen or an X group; and A is an ethylenically unsaturated hydrocarbon radical which has a vinyl group or a cycloalkenyl group.

In the formulae I-A to I-C, $R^3$ and $R^4$ are preferably each methyl. In the formula I-A, $R^6$ is, for example, a $CR^3R^4$—X group which is arranged in the para- or meta-position to the $CR^3R^4X$ group, especially when $R^5$ is hydrogen. It may also be in the meta-position when the $R^5$ group is $C_1$-$C_4$-alkyl or a $CR^3R^4$—X group. Preferred compounds I-A are, for example: 2-chloro-2-phenylpropane and 1,4-bis(2-chloro-2-propyl)benzene (1,4-dicumyl chloride, 1,4-DCC) or 1,3-bis(2-chloro-2-propyl)benzene (1,3-dicumyl chloride, 1,3-DCC).

Examples of compounds of the formula I-B are allyl chloride, methallyl chloride, 2-chloro-2-methylbutene-2 and 2,5-dichloro-2,5-dimethylhexene-3.

In the compounds I-C, $R^3$ is preferably methyl. $R^9$ is preferably an X group, and in particular halogen, especially when $R^{10}$ is methyl. Examples of compounds of the general formula I-C are 1,8-dichloro-4-p-menthane (limonene dihydrochloride), 1,8-dibromo-4-p-menthane (limonene dihydrobromide), 1-(1-chloroethyl)-3-chlorocyclohexane, 1-(1-chloroethyl)-4-chlorocyclohexane, 1-(1-bromoethyl)-3-bromocyclohexane and 1-(1-bromoethyl)-4-bromocyclohexane.

Among the compounds of the formula I-D, preference is given to those in which $R^8$ is a methyl group. Preference is also given to the compounds of the general formula I-D in which $R^8$ is an X group and in particular a halogen atom when n>0.

In compounds I-E, A is a hydrocarbon radical having generally from 2 to 21 carbon atoms which either has a vinyl group ($CH_2$=CH—) or a $C_5$-$C_8$-cycloalkenyl radical, e.g. cyclopenten-3-yl, cyclopenten-4-yl, cyclohexen-3-yl, cyclohexen-4-yl, cyclohepten-3-yl, cyclohepten-4-yl, cycloocten-3-yl, cycloocten-4-yl or cycloocten-5-yl.

A is preferably a radical of the formulae A.1, A.2 or A.3

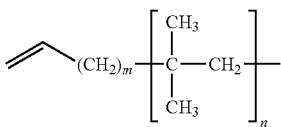

A.1

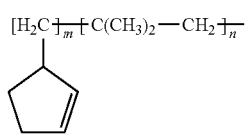

A.2

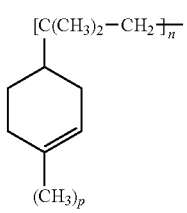

A.3 in which m is 0 or 1;

n is an integer from 0 to 3, in particular 0, 1 or 2, and p is 0 or 1.

In compounds I where A=A.2, m is preferably 1.

In compounds I where A=A.3, n is preferably 0. p is preferably 1.

Examples of initiator compounds I are:
2-chloro-2-methylbutene-3, 2-chloro-2-methylpentene-4, 2-chloro-2,4,4-trimethylhexene-5, 2-chloro-2-methyl-3-(cyclopenten-3-yl)propane, 2-chloro-2-methyl-4-(cyclohexen-4-yl)pentane and 2-chloro-2-(1-methylcyclohexen-4-yl)propene.

In compounds of the formula I-F, X is preferably chlorine. m is preferably 1 or 2 and more preferably 1. A preferred compound of the formula I-F is 3-chlorocyclopentene.

The initiators used are more preferably compounds of the formula I-A and in particular 1,4-bis(2-chloro-2-propyl)benzene (1,4-dicumyl chloride, 1,4-DCC) or 1,3-bis(2-chloro-2-propyl)benzene (1,3-dicumyl chloride, 1,3-DCC), particular preference being given to 1,4-dicumyl chloride.

The above-described initiators and processes for their preparation are known and are described, for example, in WO 02/48215, WO 03/074577 and in the German patent application 10328854.

Useful Lewis acids are covalent metal halides and semi-metal halides which have a vacant orbital for an electron pair. Such compounds are known to those skilled in the art, for example from J. P. Kennedy et al. in U.S. Pat. Nos. 4,946,889, 4,327,201, 5,169,914, EP-A-206 756, EP-A-265 053, and comprehensively in J. P. Kennedy, B. Ivan, "Designed Polymers by Carbocationic Macromolecular Engineering", Oxford University Press, New York, 1991. They are generally selected from halogen compounds of titanium, of tin, of aluminum, of vanadium, or of iron, and the halides of boron. Preference is given to the chlorides and, in the case of aluminum, also to the monoalkylaluminum dichlorides and the dialkylaluminum chlorides. Preferred Lewis acids are titanium tetrachloride, boron trichloride, boron trifluoride, tin tetrachloride, aluminum trichloride, vanadium pentachloride, iron trichloride, alkylaluminum dichlorides and dialkylaluminum chlorides. Particularly preferred Lewis acids are titanium tetrachloride, boron trichloride and ethylaluminum dichloride and in particular titanium tetrachloride. Alternatively, a mixture of at least two Lewis acids may also be used, for example boron trichloride in a mixture with titanium tetrachloride.

It has been found to be useful to carry out the polymerization in the presence of an electron donor. Preferred donors are pyridine and sterically hindered pyridine derivatives, and in particular organosilicon compounds.

The polymerization is typically performed in a solvent or solvent mixture, such as aliphatic hydrocarbons, aromatic hydrocarbons and halogenated hydrocarbons. Particularly useful solvents have been found to be toluene or 1-chlorobutane, and mixtures of aliphatic, cycloaliphatic or aromatic hydrocarbons with halogenated hydrocarbons, such as dichloromethane/n-hexane, dichloromethane/methylcyclohexane, dichloromethane/toluene, chloromethane/n-hexane, 1-chlorobutane/n-hexane, 1-chlorobutane/toluene and the like. Excess isobutene can likewise serve as a solvent in a mixture with halogenated hydrocarbons. Useful mixtures include, for example, dichloromethane/isobutene, chloromethane/isobutene, 1-chlorobutane/isobutene.

In order to introduce an olefinic double bond at the distal chain end, the reactive chain end is reacted with a terminating reagent which attaches an olefinically unsaturated group onto the chain end, or the reactive chain end is treated in a manner suitable for converting it to such a group.

In the simplest embodiment, the chain end is subjected to a dehydrohalogenation reaction, for example by thermal treatment, for example by heating to a temperature of from 70 to 200° C., or by treatment with a base. Suitable bases are, for example, alkaline metal akoxides such as sodium methoxide, sodium ethoxide and potassium tert-butoxide, basic alumina, alkali metal hydroxides such as sodium hydroxide, and tertiary amines such as pyridine or tributylamine; cf. Kennedy et al., Polymer Bulletin 1985, 13, 435-439. Preference is given to using sodium ethoxide.

Alternatively, the chain end is terminated by adding a trialkylallylsilane compound, for example, trimethylallylsilane. The use of the allylsilanes leads to the termination of the polymerization with the introduction of an allyl radical at the polymer chain end; cf. EP 264 214.

In a further embodiment, the reactive chain end is reacted with a conjugated diene such as butadiene (cf. DE-A 40 25 961) or an unconjugated diene such as 1,9-decadiene or an alkenyloxystyrene such as p-hexenyloxystyrene (cf. JP-A-4-288309).

In a further embodiment, addition of a coupling agent results in coupling of two or more living polymer chains. "Coupling" means the formation of chemical bonds between the reactive chain ends, so that two or more polymer chains are joined to form a molecule. The molecules obtained by coupling are symmetric, telechelic or star-shaped molecules having groups of the initiator, for example, cyclopentenyl groups, at the molecule ends or the ends of the branches of the star-shaped molecule.

Suitable coupling agents have, for example, at least two electrofugic leaving groups, for example trialkylsilyl groups, arranged in the allyl position to the same double bond or different double bonds, so that the cationic site of one reactive chain end can add on in a concerted reaction with elimination of the leaving group and shifting of the double bond. Other coupling agents have at least one conjugated system, to which the cationic site of a reactive chain end can add electrophilically to form a stabilized cation. Elimination of a group, for example of a proton, then results, with reformation of the conjugated system, in a stable σ-bond to the polymer chain. A plurality of these conjugated systems may be joined to one another by inert spacers.

The suitable coupling agents include:
(i) compounds which have at least two 5-membered heterocycles having a heteroatom selected from oxygen, sulfur and nitrogen, for example organic compounds which have at least two furan rings, such as

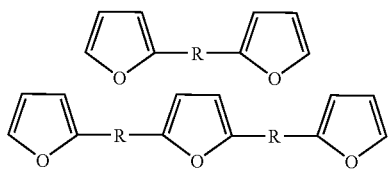

in which R is $C_1$-$C_{10}$-alkylene, preferably methylene or 2,2-propanediyl;
(ii) compounds having at least two trialkylsilyl groups in the allyl position, such as 1,1-bis(trialkylsilylmethyl)ethylenes, e.g. 1,1-bis(trimethylsilylmethyl)ethylene, or bis[(trialkylsilyl)propenyl]benzenes, e.g.

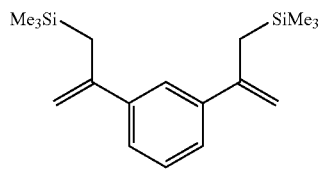

(in which Me is methyl),
(iii) compounds having at least two vinylidene groups arranged in conjugation to in each case two aromatic rings, such as bisdiphenylethylenes, e.g.

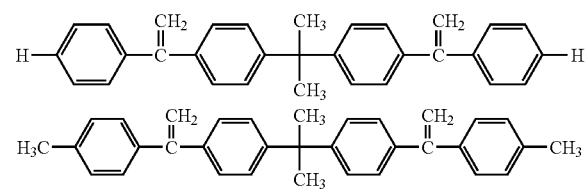

A description of suitable coupling agents can be found in the following references; the coupling reaction can be carried out analogously to the reactions described there: R. Faust, S. Hadjikyriacou, Macromolecules 2000, 33, 730-733; R. Faust, S. Hadjikyriacou, Macromolecules 1999, 32, 6393-6399; R. Faust, S. Hadjikyriacou, Polym. Bull. 1999, 43, 121-128; R. Faust, Y. Bae, Macromolecules 1997, 30, 198; R. Faust, Y. Bae, Macromolecules 1998, 31, 2480; R. Storey, Maggio, Polymer Preprints 1998, 39, 327-328; WO99/24480; U.S. Pat. No. 5,690,861 and U.S. Pat. No. 5,981,785.

The coupling is generally effected in the presence of a Lewis acid, suitable Lewis acids being those which can also be used to carry out the actual polymerization reaction. To carry out the coupling reaction, the same solvents and temperatures as are used to carry out the actual polymerization reaction are also suitable. Appropriately, the coupling can therefore be carried out as a one-pot reaction after the polymerization reaction in the same solvent in the presence of the Lewis acid used for the polymerization.

The invention also relates to a molding composition which comprises the reaction product of the above-defined isobutene polymer with a crosslinker which at least 2, preferably at least 3, functional groups reactive toward hydroxyl groups per molecule of the crosslinker.

The crosslinking reaction is effected preferably in a solvent. Suitable solvents for this purpose are saturated or unsaturated aliphatic hydrocarbons such as hexane, pentane, isopentane, cyclohexane, methylcyclohexane, diisobutene, triisobutene, tetraisobutene, pentaisobutene, hexaisobutene or mixtures thereof, aromatic hydrocarbons such as benzene, toluene, xylene, or mixtures thereof.

The functional groups reactive toward hydroxyl groups are selected, for example, from epoxy and isocyanate groups.

The crosslinker is, for example, a difunctional or higher-functionality isocyanate which is preferably selected from di-isocyanates, the biurets and cyanurates of diisocyanates, and the adducts of diisocyanates to polyols. Suitable diisocyanates have generally from 4 to 22 carbon atoms. The diisocyanates are typically selected from aliphatic, cycloaliphatic and aromatic diisocyanates, for example 1,4-diisocyanatobutane, 1,6-diisocyanatohexane, 1,6-diisocyanato-2,2,4-trimethylhexane, 1,6-diisocyanato-2,4,4-trimethylhexane, 1,2-, 1,3- and 1,4-diisocyanatocyclohexane, 2,4- and 2,6-diisocyanato-1-methylcyclohexane, 4,4'-bis(isocyanatocyclohexyl)
methane, isophorone diisocyanate (=1-isocyanato-3,3,5-trimethyl-5-isocyanatomethylcyclohexane), 2,4- and 2,6-tolylene diisocyanate, tetramethylene-p-xylylene diisocyanate (=1,4-bis(2-isocyanatoprop-2-yl)benzene), 4,4'-diisocyanatodiphenylmethane, preferably 1,6-diisocyanatohexane and isophorone diisocyanate, and mixtures thereof. Preferred compounds comprise the cyanurates and biurets of aliphatic diisocyanates, especially the cyanurates. Particularly preferred compounds are the di-isocyanurate and the biuret of isophorone diisocyanate, and the isocyanate and the biuret of 1,6-diisocyanatohexane. Examples of adducts of diisocyanates to polyols are the adducts of the abovementioned diisocyanates to glycerol, trimethylolethane and trimethylolpropane, for example the adduct of tolylene diisocyanates to trimethylolpropane, or the adducts of 1,6-diisocyanatohexane or isophorone diisocyanate to trimethylpropane and/or glycerol.

To accelerate the reaction between the isocyanate-reactive groups of the isobutene polymer and the isocyanate groups of the crosslinker, it is possible to use known catalysts, for example, dibutyltin dilaurate, tin(II) octoate, 1,4-diazabicyclo[2.2.2]-octane, or amines such as triethylamine. These are typically used in an amount of from $10^{-5}$ to $10^{-2}$ g, based on the weight of the crosslinker.

The crosslinking density can be controlled by varying the functionality of the polyisocyanate, the molar ratio of the polyisocyanate to the hydroxyl-terminated isobutene polymer, or by additional use of monofunctional compounds reactive toward isocyanate groups, such as monohydric alcohols, e.g. ethylhexanol or propylheptanol.

The crosslinker is generally used in an amount which corresponds to an NCO:OH equivalents ratio of from 0.5 to 2, preferably from 0.75 to 1.5 and most preferably from 0.8 to 1.2.

Suitable crosslinking agents are also epoxy compounds having at least two epoxide groups in the molecule, and their extension products formed by preliminary extension (prepolymers for epoxy resins, as described, for example in Ullmann's Encyclopedia of Industrial Chemistry, 6th edition, 2000, Electronic Release, in the chapter "Epoxy Resins").

Epoxy compounds having at least two epoxide groups in the molecule include, in particular:
(i) Polyglycidyl and poly(β-methylglycidyl) esters which are obtainable by reacting a compound having at least two carboxyl groups, such as an aliphatic or aromatic polycarboxylic acid, with epichlorohydrin or β-methylepichlorohydrin. The reaction is effected, preferably, in the presence of a base. Suitable aliphatic polycarboxylic acids are oxalic acid, succinic acid, glutaric acid, adipic acid, pimelic acid, azelaic acid, dimerized or trimerized linolenic acid, tetrahydrophthalic acid, hexahydrophthalic acid or 4-methylhexahydrophthalic acid. Suitable aromatic polycarboxylic acids are, for example, phthalic acid, isophthalic acid or terephthalic acid.
(ii) Polyglycidyl or poly(β-methylglycidyl) ethers which derive, for example, from acyclic alcohols, such as ethylene glycol, diethylene glycol, poly(oxyethylene) glycols, propane-1,2-diol, poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol; or cyclic alcohols such as 1,4-cyclohexanedimethanol, bis(4-hydroxycyclohexyl)methane or 2,2-bis(4-hydroxycyclohexyl)propane; or comprise aromatic rings, such as N,N-bis(2-hydroxyethyl)aniline or p,p-bis(2-hydroxyethylamino)diphenylmethane.

The glycidyl ethers may also derive from monocyclic phenols such as resorcinol or hydroquinone, or polycyclic phenols, such as bis(4-hydroxyphenyl)methane, 4,4'-dihydroxybiphenyl, bis(4-hydroxyphenyl) sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane, or from novolaks which are obtainable by condensing aldehydes, such as formaldehyde, acetaldehyde, chloral or furfural, with phenols, such as phenol, 4-chlorophenol, 2-methylphenol, 4-tert-butylphenol or bisphenols.
(iii) Poly(N-glycidyl) compounds which are obtainable by dehydrochlorinating the reaction products of epichlorohydrin with amines which have at least two amine hydrogen atoms, such as aniline, n-butylamine, bis(4-aminophenyl) methane, m-xylylenediamine or bis(4-methylaminophenyl)methane. The poly(N-glycidyl) compounds also include triglycidyl isocyanurates, N,N'-diglycidyl derivatives of alkyleneureas such as ethyleneurea or 1,3-propyleneurea, and the diglycidyl derivatives or hydantoins such as 5,5-dimethylhydantoin.
(iv) Poly(S-glycidyl) compounds such as di-S-glycidyl derivatives which derive from dithiols, such as ethane-1,2-dithiol or bis(4-mercaptomethylphenyl) ether.
(v) Cycloaliphatic epoxy compounds such as bis(2,3-epoxycyclopentyl) ether, 2,3-epoxycyclopentyl glycidyl ether, 1,2-bis(2,3-epoxycyclopentyloxy)ethane or 3,4-epoxycyclohexylmethyl 3',4'-epoxycyclohexanecarboxylate; or mixed cycloaliphatic-aliphatic epoxy compounds such as limonene diepoxide.

The inventive molding composition may additionally comprise a stiffening polymer which comprises (meth)acryloyl and/or vinylaromatic units. The stiffening is obtainable by free-radically polymerizing (meth)acrylic monomers or vinylaromatic monomers. Examples of suitable monomers are styrene, ring-alkylated styrenes with preferably $C_1$-$C_4$ alkyl radicals such as a-methylstyrene, p-methylstyrene, acrylonitrile, methacrylonitrile, acrylamide or methacrylamide, alkyl acrylates and methacrylates having from 1 to 4 carbon atoms in the alkyl radical, in particular methyl methacrylate. Preference is given to using monomers and monomer mixtures which give rise to a polymer or copolymer having a glass transition temperature of more than +20° C. and preferably more than +50° C.

The stiffening polymer may, aside from (meth)acrylic monomers or vinylaromatic monomers, comprise various monomers. The (meth)acrylic monomers or vinylaromatic monomers make up generally at least 20% by weight, preferably at least 50% by weight, in particular at least 70% by weight, of the constituent monomers.

To prepare a molding composition, the monomers which constitute the stiffening polymer are polymerized free-radically, either in the presence of a network or a crosslink isobutene polymer prepared beforehand or with simultaneous crosslinking of the isobutene polymer.

The polymerization is initiated by means of a free-radical-forming initiator or, alternatively by energy-rich radiation such as UV radiation or electron radiation. The initiator is used typically in an amount of from 0.1 to 2% by weight based on the total amount of the monomers of the stiffening polymer. Suitable initiators from the class of the peroxide compounds, azo compounds or azo peroxide compounds are known to the person skilled in the art and are commercially available.

Examples of suitable initiators include di-tert-butyloxy pivalate, didecanoyl peroxide, dilauroyl peroxide, diacetyl peroxide, di-tert-butyl peroctoate, dibenzoyl peroxide, tert-butyl peracetate, tert-butyl peroxyisopropylcarbonate, tert-butyl perbenzoate, di-tert-butyl peroxide, 1,1-bis(tert-butylperoxy)-3,3,5-trimethylcyclohexane, 2,5-dimethyl-2,5-bis(benzoylperoxy)hexane, 1,4-di(tert-butylperoxycarbonyl)cyclohexane, 1,1-bis(tert-butylperoxy)cyclohexane, di-tert-butyl diperoxyazelate or di-tert-butyl peroxycarbonate. Among these, preference is given to dilauroyl peroxide, dibenzoyl peroxide, tert-butyl perbenzoate and tert-butyl peroxyisopropylcarbonate.

The polymerization is effected typically at elevated temperature, a suitable temperature range being that from 40 to 180° C., preferably from 60 to 120° C. Advantageously, the temperature can also be increased in stages. When the polymerization is initiated by energy-rich radiation, lower temperatures are also suitable, for example ambient temperature.

The polymerization is effected typically as a bulk polymerization. Solvents can be used additionally if appropriate. For this purpose, suitable solvents are saturated or unsaturated aliphatic hydrocarbons such as hexane, pentane, isopentane, cyclohexane, methylcyclohexane, diisobutene, triisobutene, tetraisobutene, pentaisobutene, hexaisobutene or mixtures thereof, aromatic hydrocarbons such as benzene, toluene, xylene or mixtures thereof. The polymerization can also be performed in the presence of a plasticizer or of a plasticizer mixture, such as the phthalates and adipates of aliphatic or aromatic alcohols, for example di(2-ethylhexyl) adipate, di(2-ethylhexyl) phthalate, diisononyl adipate or diisononyl phthalate.

When the polymerization is performed in the presence of the isobutene polymer crosslinked beforehand, the rubberlike isobutene network may either be present in the desired shape of the finished molding or in comminuted form, for example as a granule or dispersion. The rubberlike isobutene polymer network can be equilibrated or swelled adequately with the monomers which form the stiffening polymer of the second phase. For better swelling, the additional use of one of the solvents mentioned may be advantageous. If desired, assistants may be incorporated in this stage of the preparation process. After the equilibration or swelling, the polymerization is initiated in a suitable manner, for example by increasing the temperature.

The inventive molding compositions may additionally comprise customary assistants such as fillers, diluents or stabilizers.

Suitable fillers are, for example, silica, colloidal silica, calcium carbonate, carbon black, titanium dioxide, mica and the like.

Suitable diluents are, for example, polybutene, liquid polybutadiene, hydrogenated polybutadiene, paraffin oil, naphthenenates, atactic polypropylene, dialkyl phthalates, reactive diluents, for example, alcohols and oligoisobutenes.

Suitable stabilizers are, for example, 2-benzothiazolyl sulfide, benzothiazole, thiazole, dimethyl acetylenedicarboxylate, diethyl acetylenedicarboxylate, BHT, butylhydroxyanisole, vitamin E.

The invention is illustrated in detail by the appended FIGURE and the examples which follow.

FIG. 1 shows the plot of the storage modulus in MPa as a function of the temperature of a network formed from a bifunctional hydroxy-terminated polyisobutene and a polyisocyanate (curve 1) and of a network formed from an inventive polyisobutene with 1,3-propanediol end groups and the same polyisocyanate (curve 2).

COMPARATIVE EXAMPLE 1 g of α,ω-dihydroxypolyisobutene (Mn 2100) was dissolved in 1 ml of toluene and admixed with 220 mg of Basonat® HI 100 (polyisocyanate from BASF having a functionality of about 3.3; isocyanurate based on hexmethylene diisocyanate) and 2 mg of dibutyltin dilaurate, and mixed thoroughly. The mixture was poured into a dish and heated to 60° C. for 6 hours. A slightly tacky, transparent, toluene-containing network was obtained, which was subjected to dynamic and mechanical analysis. The storage modulus at 75° C. was 0.7 MPa. The plot of the storage modulus in MPa as a function of the temperature is shown in FIG. 1 (curve 1).

Example 1

Preparation of Polyisobutene

A 1l four-neck flask to which a dropping funnel with pressure equalizer and a dry ice cooler and drying tube had been attached was initially charged with 1-chlorobutane (440 ml) and, as an indicator, phenanthroline (20 mg). Isobutene (560 ml) was then condensed into the dropping funnel and the contents of the dropping funnel were entered into the flask. A syringe was used to admix the mixture with a solution of butyllithium in hexane (1.1 M, about 10 ml), until a lasting brown color occurred.

A second 1 l four-neck flask to which a dropping funnel with pressure equalizer and a dry ice cooler and drying tube had been attached and which was connected to the first column via a closable pipe connection was initially charged with 1,3-dicumyl chloride (43.6 g). The contents of the first flask were heated while gently cooling the second flask, so that the contents of the first flask distilled over into the second flask.

In the second flask, phenyltriethyoxysilane (1.44 g) was added by means of a syringe with stirring, and the mixture was cooled to −76° C. with acetone/dry ice. TiCl$_4$ (2.0 ml) was then added by means of a syringe and, after a reaction time of 30 minutes, acetonitrile (2 g).

The resulting brown precipitate was filtered off; the filtrate was swirled over alumina (spheres with diameter 2-3 mm; 100 g) for 10 min. The solvent was removed at room temperature under reduced pressure.

The molecular weight Mn of the resulting polymer was 2227 (GPC determination), the dispersity 1.40. The average content of chlorine atoms per polyisobutene molecule was 1.9 (determination by $^1$H NMR).

100 g of the polymer thus obtained were dissolved in 100 ml of tetrahydrofuran and heated to boiling under reflux with 10 g of potassium tert-butoxide. This was followed by admixing with 200 ml in each case of heptane, isopropanol and water, mixing and separation of the aqueous phase after 10 min. The organic phase was washed twice with 200 ml of saturated sodium chloride solution, dried over sodium sulfate and concentrated to dryness.

In the $^1$H NMR, 98% olefin groups were found (olefinic protons at 4.6 and 4.8 ppm).

Example 2

Epoxidation 200 g of polyisobutene from example 1, 200 ml of toluene, 20 g of formic acid, 62 g of acetic acid and 50 g of hydrogen peroxide (50% by weight aqueous solution) were heated to 60° C. in a 1 l four-neck flask with heating bath, stirrer and water separator with vigorous stirring at 330 mbar. An exothermic reaction set in, which was recognizable by the commencement of reflux. After 30 minutes, the bath temperature was increased to 80° C. About 25 ml of water were separated out and the mixture stirred for another 1 hour. The reaction mixture was cooled with ice and the aqueous phase was allowed to separate out. After 5 min, the aqueous phase (75 ml) was removed, and the organic phase was admixed with 60 ml of water and stirred for 5 min. After 5 min, the stirrer was switched off and, after a further 5 min, 68 ml of aqueous phase were removed. The washing operation was repeated; thereafter the organic phase had an acid number of 2 and still comprised approx. 10 ppm of peroxide, which were destroyed by adding 30 g of saturated $FeCl_2$ solution. The organic phase was removed and dried over sodium sulfate, and a sample was concentrated to dryness at room temperature under reduced pressure (2 mbar).

The $^1$H NMR showed about 1.6% olefin groups (4.6-5.2 ppm) and 98% epoxy groups, of which 97% were 1,2-epoxide (2.55-2.59 ppm), and 1% were 2,3-epoxide (2.53-2.55 ppm), based on the aromatic proton at 7.4 ppm.

Example 3

Preparation of a Polyol

The epoxide from example 2 was used and the method of EP-A 737 662, example 1 was employed.

An OH functionality of 3.5 was obtained, based on the aromatic proton at 7.4 ppm.

Example 4

1 g of polyisobutene polyol from example 3 was dissolved in 1 ml of toluene and stirred with 300 mg of Basonat Hl 100 for 30 min, then admixed with 3 mg of dibutyltin dilaurate, poured out into a dish and heated to 100° C. for 6 hours. A slightly tacky, transparent network was obtained, which was subjected to dynamic and mechanical analysis. The storage modulus at 75° C. was 8 MPa. The plot of the storage modulus in MPa as a function of the temperature is shown in FIG. 1 (curve 2).

The invention claimed is:

1. A molding composition comprising (1) the reaction product of an isobutene polymer which comprises an average of at least 1.4 terminal propanediol groups with a crosslinker which comprises at least two functional groups reactive toward hydroxyl groups per molecule of the crosslinker and (2) a stiffening polymer which comprises (meth)acryloyl and/or vinylaromatic units.

2. The molding composition according to claim 1, wherein the isobutene polymer comprises an average of at least 1.7 terminal 1,3-propanediol groups.

3. The molding composition according to claim 1, wherein the isobutene polymer has an average number molecular weight of from 500 to 50,000 before the reaction with the crosslinker.

4. The molding composition according to claim 1, wherein the functional groups reactive toward hydroxyl groups are selected from epoxy and isocyanate groups.

5. The molding composition according to claim 4, wherein the crosslinker is a difunctional or higher-functionality isocyanate.

6. The molding composition according to claim 1, wherein the isobutene polymer comprises at least 1.8 terminal 1,3-propanediol groups.

7. The molding composition according to claim 1, wherein the isobutene polymer is a linear polymer having substantially 1,3-propanediol groups at both ends of the molecule.

8. The molding composition according to claim 1, wherein the isobutene polymer is a is star-shaped with three or four branches that have 1,3-propanediol groups at all ends of the molecule.

9. The molding composition according to claim 1, wherein the stiffening polymer has a glass transition temperature of more than +20° C.

10. The molding composition according to claim 1, wherein the stiffening polymer has a glass transition temperature of more than +50° C.

11. An isobutene polymer wherein the polymer is star-shaped with three or four branches that have 1,3-propanediol groups at all ends of the molecule.

12. The isobutene polymer according to claim 11, which has an average number molecular weight of from 500 to 50,000.

* * * * *